Patented Oct. 1, 1940

2,216,222

UNITED STATES PATENT OFFICE 2,216,222

PROCESS OF OXIDIZING PARAFFINIC HYDROCARBONS

Hans Beller, New York, N. Y., and John J. Owen, Baton Rouge, La., assignors to Jasco, Incorporated, a corporation of Louisiana No Drawing. Application April 20, 1938,
Serial No. 203,114

5 Claims. (Cl. 260—451)

The present invention relates to the liquid phase oxidation of non-aromatic hydrocarbons of high molecular weight.

One object of our invention is to improve the effectiveness of catalysts employed in the liquid phase oxidation of paraffin hydrocarbons of high molecular weight.

Another object is an improved oxidation process operating with greater efficiency of catalytic action.

Further objects of our invention will be seen from the following description.

Oxidation of paraffin hydrocarbons of high molecular weight in the liquid phase is a known expedient in the production of mixtures of oxygenated hydrocarbons from such sources. Various mixtures of high molecular fatty acids and alcohols are thereby obtained which are useful in the production of wetting, emulsifying and cleansing agents.

The initial material in the liquefied state is exposed to the action of a gas containing oxygen, such as air, and a catalytically acting substance may be kept present in the reaction liquid in order to control the course of the oxidation in its various aspects, such as speed, temperature, nature of the oxidation products obtained and the like.

In the field of liquid phase oxidation of paraffin hydrocarbons it has been the general belief that the oxidation catalysts should be soluble in the material to be oxidized. The catalytic action is expected to be greatly facilitated and enhanced thereby. Oil soluble substances, such as stearates, oleates, and abietates of heavy metals and metallic enolates have been found suitable in that respect. These substances do not sufficiently respond, however, to an indispensable requirement of the present development in this art which is to conduct the liquid phase oxidation of paraffin hydrocarbons without substantial superoxidation of the original materials so that a preponderance of high molecular acids and alcohols results which have the oxygen content of normal acids and alcohols. This course of the oxidation can be secured chiefly by operation of the oxidation process at low temperatures, say from about 100° to 120° C., but not much higher. However, it is apparent from the art and has been confirmed by our experience that oxidation in the presence of oil-soluble catalysts, such as mentioned before, does not commence at a practically feasible rate of speed until much higher temperatures of from about 130° to 150° C. are reached. The result may be an oxidation product having a preponderance of compounds of various degrees of oxidation which are superoxidized and discolored and possess a disagreeable odor, and which product is therefore of diminished value for the wetting, cleansing and detergent industry.

Being confronted with the intensely practical problem of remedying this situation, we have now found that certain catalysts containing manganese in the anion and an alkali metal in the cation, such as potassium permanganate, which are not soluble in the oxidation charge, can be used very effectively as oxidation catalysts when added to the oxidation charge in water solution.

From a technical viewpoint, our discovery has resulted in considerable improvement. It gives us an immediate start of the oxidation and facilities a high and uniform rate of oxidation; it furthermore enables us to perform the oxidation within the desirable low temperature range and thus to obtain an oxidation product of superior quality.

Generally speaking, our catalysts for the liquid phase oxidation of paraffinic or naphthenic hydrocarbons of high molecular weight or of mixtures of these hydrocarbons, which are soluble in water, such as potassium permanganate, are added in water solution. Upon the evaporation of the water, the catalyst is left in a finely divided state which is very active. This is especially applicable to catalysts which are in themselves oxidizing agents and which in the form of a water solution will react with the charge to oxidation to assist in the starting of the oxidation reaction.

When finely powdered potassium permanganate is added to a charge of paraffin or naphthene hydrocarbons of high molecular weight (such as crude scale wax) for liquid phase oxidation by blowing with air at 110° to 150° C., a prolonged period of initial heating is necessary to cause oxidation to take place readily. This initial period of heating may require several hours if it takes place without blowing the charge with air or other gaseous oxidizing agents. Even when heated under oxidizing conditions the time may be reduced, but oxidation proceeds more slowly than when a water solution of the catalyst (preferably an almost saturated solution) is used. The following chart illustrates this:

Example

| | Run No. | | |
|---|---|---|---|
| | 3K-77 | 3K-78 | G. O. 35 |
| Charge to oxidation | Crude scale wax | Crude scale wax and return wax. | 40% crude scale wax—60% return wax. |
| Percent catalyst | 0.15% KMnO₄ finely ground. | 0.15% KMnO₄ in water solution. | 0.15% KMnO₄ (a) in water solution. (b) finely ground solid. |
| Air rate | 18 | 18 | 18 |
| Cu. ft./hr. kg. charge, temp., °C. | 141-143 for 4 hours | 141-143 for 30 min. reduced to 113-117° for remainder of run. | 120° for first hour, 115° remainder. |

| | Acid number | | |
|---|---|---|---|
| | | (a) | (b) |
| After ½ hour | | 8.2 | |
| After 1 hour | | 0 | 0 |
| After 1½ hours | 0.7 | 19.7 | |
| After 2 hours | | 0.4 | 0.4 |
| After 2½ hours water solution of cat. added to 3K-77 | | | |
| After 3 hours | 11.2 | 3.4 | 0.7 |
| After 4 hours | 29 | 7.6 | 0.9 |
| After 4½ hours | 47 | | |
| After 5 hours | | 13.7 | 1.0 |
| After 6 hours | | 23.1 | 1.9 |
| After 7 hours | | 27.1 | 3.7 |
| After 7¼ hours (final) | | 31.3 | 4.1 |

At the end of 2½ hours in Run 3K-77, where finely powdered potassium permanganate was used, no oxidation was evident. A water solution of the catalyst was then added to the same charge and oxidation started immediately, giving an acid number of 11.2 after 30 minutes. In comparing Runs 3K-77 and 3K-78, it will be observed that a temperature of approximately 141° to 143° C. was maintained in Run 3K-77 for 4 hours, whereas this temperature was held for only 30 minutes in Run 3K-78, after which it was lowered to 113° to 117° C. for the remainder of the oxidation.

The following examples illustrate the process described. In these examples as well as in the above table, the term "return wax" describes the unsaponifiable portion of the oxidation product of hydrocarbons which can be separated by various methods, such as saponification and extraction, and which is usually mixed with some crude scale wax and recycled to the oxidation process. It consists chiefly of hydrocarbons and neutral oxidation products, such as alcohols, aldehydes, ketones and the like in various proportions. In the following examples, the parts are by weight.

Example 1

A mixture of 40 parts of crude scale wax and 60 parts of return wax, to which 0.15% of potassium permanganate in water solution was added, was oxidized with air at a temperature of 115° C. After 7¼ hours oxidation the acid number of the product obtained was 31.3. An identical oxidation charge treated under identical conditions but containing 0.15% potassium permanganate as a finely ground powder gave after 7¼ hours oxidation a product with an acid number of 4.1. The water used for dissolving the catalyst as described above was removed in the oxidation vessel by blowing with air at 110° C.

Example 2

To a mixture of 80 parts of crude scale wax and 20 parts of return wax 0.15% permanganate in a 10% water solution was added. This mixture was heated to 105° C. with constant stirring until the water was removed, and then transferred to an oxidation tower where it was blown with air at a temperature of 115° C. The reaction started immediately and after 12 hours oxidation a product was obtained which had an acid number of 65.

Example 3

To a mixture of 40 parts of crude scale wax, 60 parts of return wax and 3 parts of oxidation product from crude scale wax was added 0.1 part of potassium permanganate dissolved in 2 parts of acetone. The solvent was removed by heating the mixture to 100° C. during agitation. Air was then introduced into the mixture at 110° C. through a porous plate at the rate of 500 liters per hour per kilogram of charge. After 12 hours oxidation an acid number of 35 was obtained in the product.

The aqueous solution of alkali-manganese compound is added to the paraffin hydrocarbon to be oxidized. The ingredients are well mixed and the solvent is removed from the oxidation charge preferably by mild heating before the material is pumped to the oxidation tower. Or the catalyst solution is added to the charge in the oxidation tower and removed there by blowing with air or inert gases at elevated temperature. As a rule the oxidation starts after the solvent has been removed.

Other suitable solvents, besides water, are organic solvents such as acetone, methyl- or ethyl-alcohol, methylethylketone, acetonnitrile and pyridine, or mixtures of water and water-soluble organic solvents.

The hydrocarbon material to be oxidized may consist of various fractions of crude oils such as sweater oil, gas oil, crude scale wax or products from the cracking or hydrogenation of hydrocarbons, tar, coal and the like, or from products obtained in the hydrogenation of carbon monoxides, as well as of mixtures of this hydrocarbon material and "return wax". In the appended claims the term "hydrocarbon material" is meant to include the various aforementioned fractions and products and the said mixtures.

The proportion of the catalyst should include amounts of 0.05 up to say 0.3% of the oxidation charge, which figures are to be considered only as examples and not as limitations.

It should be understood that oxidation temperatures of from about 100° to about 160° C. are included within the scope of my example. The preferred temperature range, as pointed out before, is between about 100° and about 120° C., but the method will also operate at higher or lower temperatures including the entire range of liquid state between the melting and evaporation points of the initial material employed.

What we claim is:

1. In the liquid phase oxidation of a high molecular paraffinic hydrocarbon material the steps which comprise adding to the initial material a solution of a catalyst in a solvent selected from the group consisting of water, a water-soluble organic solvent, a mixture of water and a water-soluble organic solvent, and containing manganese in the anion and a alkali metal in the cation, mixing the ingredients, removing the solvent, and subjecting the mixture to oxidation by means of an oxidizing gas containing oxygen at an elevated temperature of from about 100° to about 120° C.

2. In a liquid phase oxidation of a high molecular paraffinic hydrocarbon material the steps which comprise adding to the initial material a catalytic solution of potassium permanganate in a solvent selected from the group consisting of water, a water-soluble organic solvent, a mixture of water and a water-soluble organic solvent, and mixing the ingredients, removing the solvent and subjecting the mixture to oxidation by means of an oxidizing gas containing oxygen at an elevated temperature of from about 100° to about 120° C.

3. In a liquid phase oxidation of a high molecular paraffinic hydrocarbon material the steps which comprise adding to the initial material a solution containing from 0.05% to 0.3% of a catalyst consisting of manganese in the anion and an alkali metal in the cation in a solvent selected from the group consisting of water, a water-soluble organic solvent, a mixture of water and a water-soluble organic solvent, mixing the ingredients, removing the solvent, and subjecting the mixture to oxidation by means of an oxidizing gas containing oxygen at an elevated temperature of from about 100° to about 120° C.

4. In the liquid phase oxidation of a high molecular paraffinic hydrocarbon material the steps which comprise adding into the initial material charged into the oxidation tower a solution of a catalyst containing manganese in the anion and an alkali metal in the cation in a solvent selected from the group consisting of water, a water-soluble organic solvent, a mixture of water and a water-soluble organic solvent, mixing the ingredients, removing the solvent by blowing the charge with a gas selected from the group consisting of air and inert gas at an elevated temperature of from about 100° to about 160° C., and subjecting the mixture to oxidation by means of an oxidizing gas containing oxygen at an elevated temperature of from about 100° to about 120° C.

5. In a liquid phase oxidation of a high molecular nonaromatic hydrocarbon material the steps which comprise adding to the initial material a solution of a catalyst containing manganese in the anion and an alkali metal in the cation, mixing the ingredients, removing the solvent and subjecting the mixture to oxidation by means of an oxidizing gas containing oxygen at an elevated temperature range including the entire range of liquid state between the melting point of the initial material employed and 120° C.

HANS BELLER.
JOHN J. OWEN.